US012008012B2

(12) United States Patent
Tyercha et al.

(10) Patent No.: US 12,008,012 B2
(45) Date of Patent: *Jun. 11, 2024

(54) DATA TRANSFER IN A COMPUTER-IMPLEMENTED DATABASE

(71) Applicant: SAP SE, Walldorf (DE)

(72) Inventors: Edward-Robert Tyercha, Heidelberg (DE); Janardhan Hungund, Pune (IN); Deepak Shrivastava, Pune (IN)

(73) Assignee: SAP SE, Walldorf (DE)

(*) Notice: Subject to any disclaimer, the term of this patent is extended or adjusted under 35 U.S.C. 154(b) by 0 days.

This patent is subject to a terminal disclaimer.

(21) Appl. No.: 18/054,515

(22) Filed: Nov. 10, 2022

(65) Prior Publication Data

US 2023/0066096 A1    Mar. 2, 2023

Related U.S. Application Data

(63) Continuation of application No. 16/375,101, filed on Apr. 4, 2019, now Pat. No. 11,526,527.

(51) Int. Cl.
*G06F 16/25* (2019.01)
*G06F 16/21* (2019.01)
*G06F 16/22* (2019.01)

(52) U.S. Cl.
CPC .......... *G06F 16/254* (2019.01); *G06F 16/214* (2019.01); *G06F 16/221* (2019.01); *G06F 16/2282* (2019.01)

(58) Field of Classification Search
CPC .... G06F 16/254; G06F 16/214; G06F 16/221; G06F 16/2282
See application file for complete search history.

(56) References Cited

U.S. PATENT DOCUMENTS

| | | | |
|---|---|---|---|
| 10,268,709 B1* | 4/2019 | Suehs | G06F 16/211 |
| 10,867,063 B1* | 12/2020 | Avanes | G06F 16/25 |
| 10,977,267 B1* | 4/2021 | O'Connor | G06F 3/048 |
| 11,604,804 B2* | 3/2023 | Bapat | G06F 16/27 |
| 2004/0153459 A1* | 8/2004 | Whitten | G06F 16/214 |
| 2005/0144176 A1* | 6/2005 | Lei | G06F 21/6227 |
| 2005/0198074 A1* | 9/2005 | Khayter | G06F 16/27 |
| 2007/0214127 A1* | 9/2007 | La Rue | G06F 16/254 |
| 2009/0112889 A1* | 4/2009 | Lee | H04L 49/90 |
| 2012/0066263 A1* | 3/2012 | Wildermuth | G06F 16/254 707/792 |

(Continued)

*Primary Examiner* — Robert W Beausoliel, Jr.
*Assistant Examiner* — Susan F Rayyan
(74) *Attorney, Agent, or Firm* — Mintz Levin Cohn Ferris Glovsky and Popeo, P.C.

(57) ABSTRACT

Computer-implemented methods, systems and products, the method comprising receiving, at a data server associated with a database, a command for data transfer between a client machine and the data server over a communications network, the data being stored in at least a data table comprising one or more columns; in response to receiving the command for data transfer, determining whether one or more columns of the data table are designated; identifying the one or more designated columns, such that data associated with the one or more designated columns is either considered or not considered for purpose of the data transfer; and executing the command to transfer the data in the database according to the designated columns.

13 Claims, 7 Drawing Sheets

(56) References Cited

U.S. PATENT DOCUMENTS

| | | | |
|---|---|---|---|
| 2013/0151491 A1* | 6/2013 | Gislason | G06F 16/2282 |
| | | | 707/696 |
| 2015/0058522 A1* | 2/2015 | Armstrong | G06F 12/1009 |
| | | | 711/6 |
| 2015/0363456 A1* | 12/2015 | Raman | G06F 16/282 |
| | | | 707/693 |
| 2016/0179850 A1* | 6/2016 | Martin | G06F 16/278 |
| | | | 707/634 |
| 2017/0147618 A1* | 5/2017 | Geissinger | G06F 16/25 |
| 2018/0096001 A1* | 4/2018 | Soza | G06F 16/235 |
| 2019/0026339 A1* | 1/2019 | Bastawala | G06F 16/221 |
| 2019/0361971 A1* | 11/2019 | Zenger | G06F 16/288 |
| 2020/0110822 A1* | 4/2020 | Pantela | G06F 16/2379 |
| 2021/0349648 A1* | 11/2021 | Fatemieh | G06F 16/24554 |

* cited by examiner

FIG. 4

DATA TRANSFER IN A COMPUTER-IMPLEMENTED DATABASE

CROSS REFERENCE TO RELATED APPLICATION

This application is a continuation of U.S. patent application Ser. No. 16/375,101 filed on Apr. 4, 2019, entitled "DATA TRANSFER IN A COMPUTER-IMPLEMENTED DATABASE". The entire contents of this application are incorporated herein by reference in its entirety.

TECHNICAL FIELD

The disclosed subject matter generally relates to data transfer in a computing environment and, more particularly, to providing an efficient method for importing or exporting data storable in a database.

BACKGROUND

Conventional databases may include database management systems, such as Hasso's New Architecture (HANA), which is a relational database developed and marketed by SAP® corporation. A system like HANA may be configured to perform predictive analytics, spatial data processing, text analytics, text search, streaming analytics, graph data processing and to also provide data extract, transform, load (ETL) capabilities as a database server.

One function of HANA as a database server is to store and retrieve data by way of import or export of data tables. To perform data import or export operations, a user may use a command line or a graphical user interface. Examples of command lines for importing or exporting data tables are provided below:

EXPORT "SCHEMA1_PATH" INTO 'tmp'
IMPORT "SCHEMA2_PATH" FROM 'tmp'

Because the HANA architecture is column oriented, during an import or export operation, data in all columns in a requested table is transferred without providing the user with a choice to selectively transfer data. This wholesale data transfer scheme can be inefficient, in both time and use of resource, particularly when data in only some of the data columns needs to be transferred.

SUMMARY

For purposes of summarizing, certain aspects, advantages, and novel features have been described herein. It is to be understood that not all such advantages may be achieved in accordance with any one particular embodiment. Thus, the disclosed subject matter may be embodied or carried out in a manner that achieves or optimizes one advantage or group of advantages without achieving all advantages as may be taught or suggested herein.

In accordance with some implementations of the disclosed subject matter, computer-implemented methods, systems and products for transferring data in a database are provided. An example method comprises receiving, at a data server associated with a database, a command for data transfer between a client machine and the data server over a communications network, the data being stored in at least a data table comprising one or more columns; in response to receiving the command for data transfer, determining whether one or more columns of the data table are designated; identifying the one or more designated columns, such that data associated with the one or more designated columns is either considered or not considered for purpose of the data transfer; and executing the command to transfer the data in the database according to the designated columns.

The data table may have a first data structure including a plurality of columns and metadata associated with one or more columns to designate whether data associated with a column should or should not be transferred. Data designated for transfer is transferred with the data table, such that the data table is copied to a destination storage device, the copied data table maintaining the first data structure after the transfer is completed. The client machine comprises a computing system used by a user issuing the command for the data transfer. The command may be an import command or an export command. The data associated with the one or more designated columns may be either included or excluded from the data transfer, depending on implementation or parameters used with the command. In some embodiments, the database may comprise an in-memory column-oriented or row-oriented relational database.

The details of one or more variations of the subject matter described herein are set forth in the accompanying drawings and the description below. Other features and advantages of the subject matter described herein will be apparent from the description and drawings, and from the claims. The disclosed subject matter is not, however, limited to any particular embodiment disclosed.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations as provided below.

FIGS. 4 and 5 are block diagrams of example computing data structures for importing data, in accordance with one embodiment.

The figures may not be to scale in absolute or comparative terms and are intended to be exemplary. The relative placement of features and elements may have been modified for the purpose of illustrative clarity. Where practical, the same or similar reference numbers denote the same or similar or equivalent structures, features, aspects, or elements, in accordance with one or more embodiments.

DETAILED DESCRIPTION OF EXAMPLE IMPLEMENTATIONS

In the following, numerous specific details are set forth to provide a thorough description of various embodiments. Certain embodiments may be practiced without these specific details or with some variations in detail. In some instances, certain features are described in less detail so as not to obscure other aspects. The level of detail associated with each of the elements or features should not be construed to qualify the novelty or importance of one feature over the others.

Figure 1:
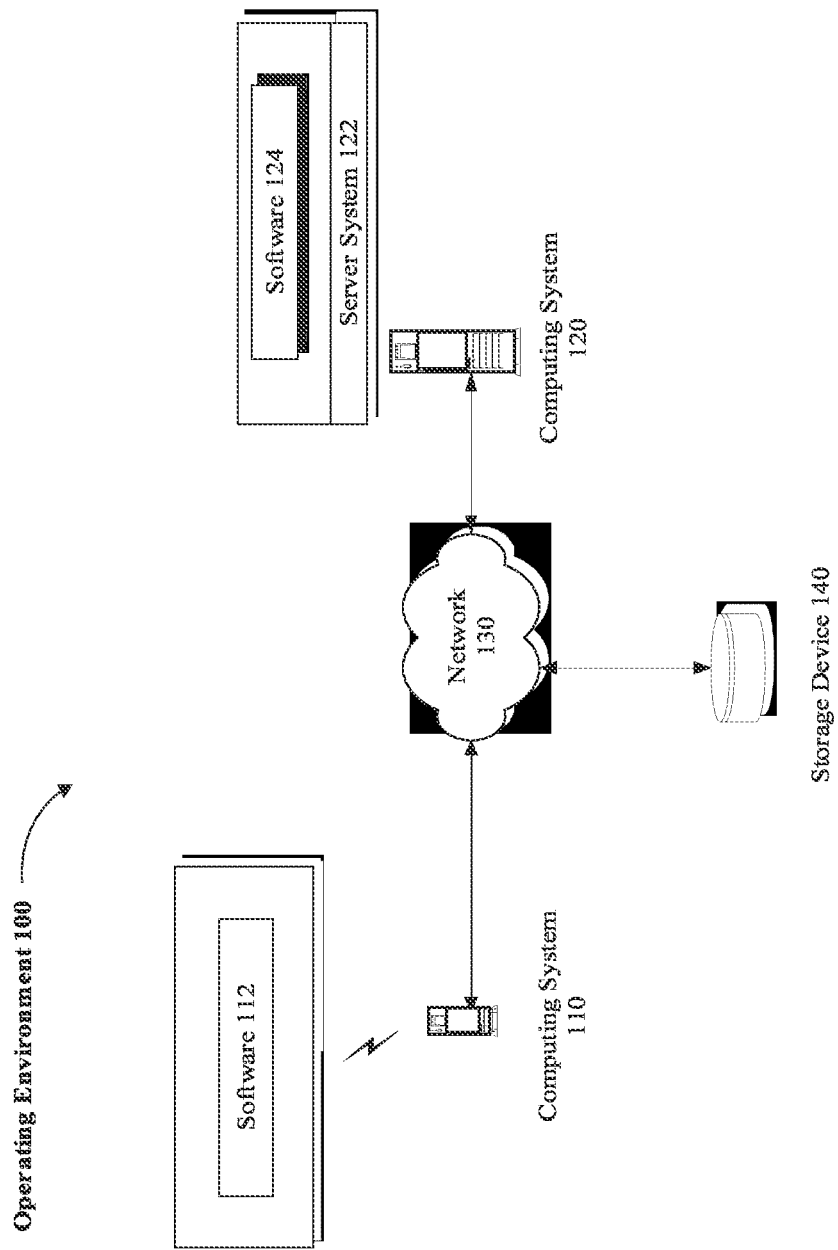
FIG. 1 illustrates an example operating environment in accordance with one or more embodiments.

Referring to FIG. 1, an example operating environment 100 is illustrated in which a computing system 110 may be used by a user to interact with software 112 being executed on computing system 110. The computing system 110 may be a general purpose computer, a handheld mobile device (e.g., a smart phone), a tablet, or other communication capable computing device. Software 112 may be a web browser, a dedicated app or other type of software application running either fully or partially on computing system 110 in order to allow a user to access or transfer data.

Computing system 110 may communicate over a network 130 to access data stored on storage device 140 or to access services provided by a computing system 120. Depending on implementation, storage device 140 may be local to, remote to, or embedded in one or more of computing systems 110 or 120 as one or more arrays of solid state memory devices or disk drives. A server system 122 may be configured on computing system 120 to service one or more requests submitted by computing system 110 or software 112 (e.g., client systems) via network 130. Network 130 may be implemented over a local or wide area network (e.g., the Internet).

Computing system 120 and server system 122 may be implemented over a centralized or distributed (e.g., cloud-based) computing environment as dedicated resources or may be configured as virtual machines that define shared processing or storage resources. Execution, implementation or instantiation of software 124, or the related features and components (e.g., software objects), over server system 122 may also define a special purpose machine that provides remotely situated client systems, such as computing system 110 or software 112, with access to a variety of data and services as provided below.

In accordance with one or more implementations, the provided services by the special purpose machine or software 124 may include providing a user, using computing system 110 or software 112, with the capability to access data stored in a relational database implemented over storage device 140. In example embodiments, the relational database may be an in-memory, column-oriented, relational database management system, such as SAP HANA.

It is noteworthy that while certain implementations disclosed herein are provide with reference to a column-oriented database, the disclosed subject matter may be utilized in some variations as applied to a row-oriented database as well, depending on implementation. In one example, server system 122 may act as a database server to store and retrieve data as requested by applications such as software 112 running on a client system (e.g., computing system 110). The database server may perform advanced analytics and provide capabilities to extract, transform, or load data, including importing and exporting data from a database supported by storage device 140 or server system 122.

The database may be implemented as an in-memory database. Online analytical processing (OLAP) and online transaction processing (OLTP) operations may be combined into a single system, for example, in accordance with one or more implementations. By storing data in main memory rather than on disk, faster data access and faster data querying and processing may be possible. While storing data in memory confers performance advantages, it is a more costly form of data storage. Therefore, to be cost-effective, less frequently accessed data may be stored on disk, using a dynamic tiering approach, for example. An example database management system as consistent with the disclosed features may be configured to include one or more of a row store or a columnar store (i.e., a row-based data model, or a column-based data model). As such, users may create data tables using either data model type or store.

Figure 2:
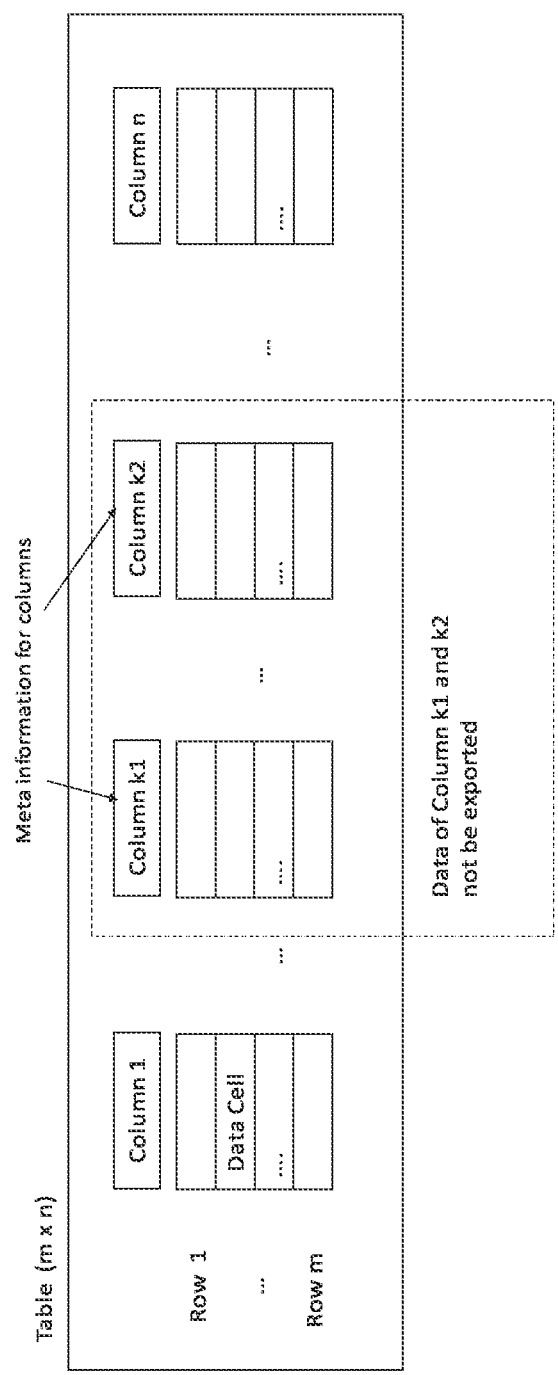
FIGS. 2 and 3 are block diagrams of example computing data structures for exporting data, in accordance with one embodiment.

Referring to FIG. 2, in a column-oriented database implementation, data for a single column in an m×n data table may be stored in the same location or same area in memory. This is in contrast to a row-oriented implementation in which data for a single row is stored in the same location or area in memory. Performance improvements for OLAP queries on large datasets may be achieved in a column-oriented implementation due to greater vertical compression of similar types of data in a single column. Such implementation may also provide for fast read times for column-stored data and the ability to consolidated views of the data on the fly. As such, a column-oriented databased implementation may be utilized to obviate the need for maintaining aggregate views and the overhead associated with data redundancy.

An index server (not shown separately) may be also implemented to perform session management, authorization, transaction management and command processing. The index server may be, for example, implemented as a part of server system 122 or as an independent module and may be utilized to manage persistence between cached memory images of database objects, log files and permanent storage files.

Referring back to FIG. 2, a data table with m rows (1 through m) and n columns (1 through n) is illustrated. As shown, one or more columns are implemented in association with meta information (i.e., metadata). Metadata is information that provides additional information about data stored in the data table, for example. In one or more implementations, metadata associated with a column k may indicate that the data stored in column k should or should not be imported or exported, for example.

In accordance with one implementation, in order to reduce overhead and costs associated with importing or exporting data tables with very large volumes of data, a user is provided with the option to specify or select one or more columns in a data table. The selected columns may be designated as columns in which data may be omitted during one or more import or export processes. Desirably, even though data stored in certain selected columns is omitted, the definition of the data table itself remains unchanged during the import or export. Thus, effectively, data stored in the data table is skipped during the data transfer, while the structure of the data table remains intact.

Figure 3:
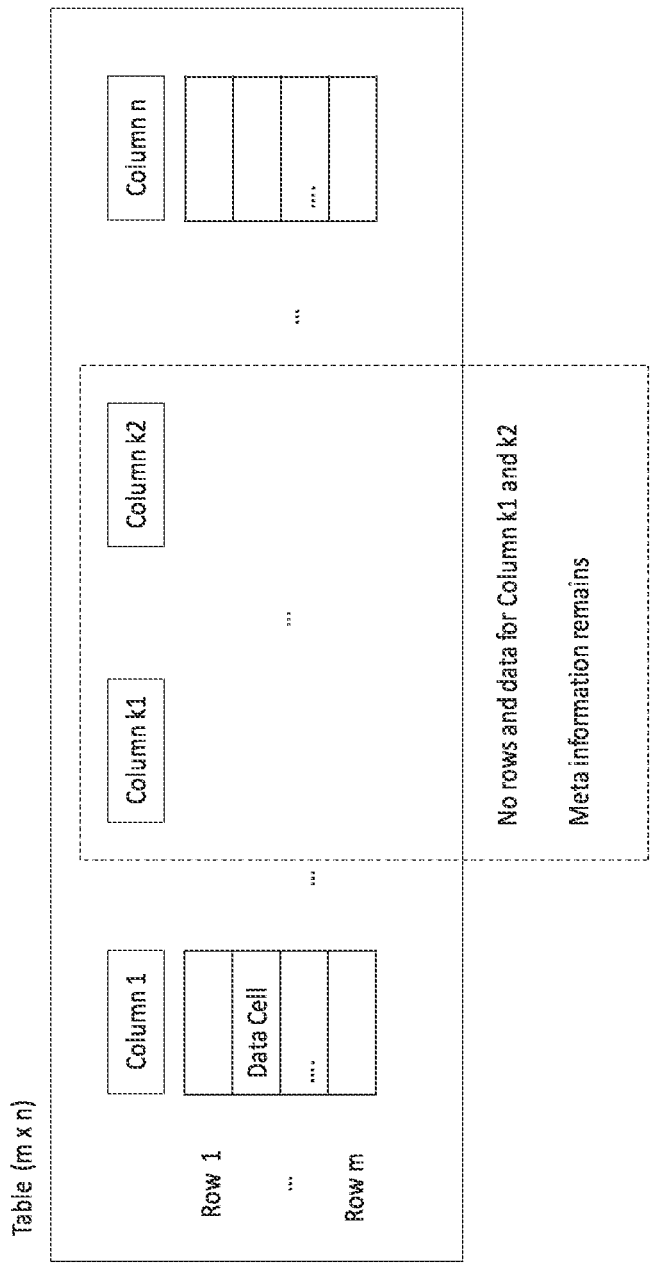

Referring to FIGS. 2 and 3, an export procedure may be initiated by a user by introducing the command EXPORT "SCHEMA1_PATH" k1 k2 INTO 'tmp', for example, with the intention to export all data stored in the data table, with the exception of data stored in columns k1 and k2. As shown in FIG. 3, after the export operation is completed, the structure of the data table is maintained (i.e., the data table includes columns 1 through n and the corresponding metadata). In one example scenario, data stored in the identified columns k1 and k2 is not transferred. In some implementation, rows 1 through m associated with the designated columns are not maintained in the exported version of the data table.

Figure 4:
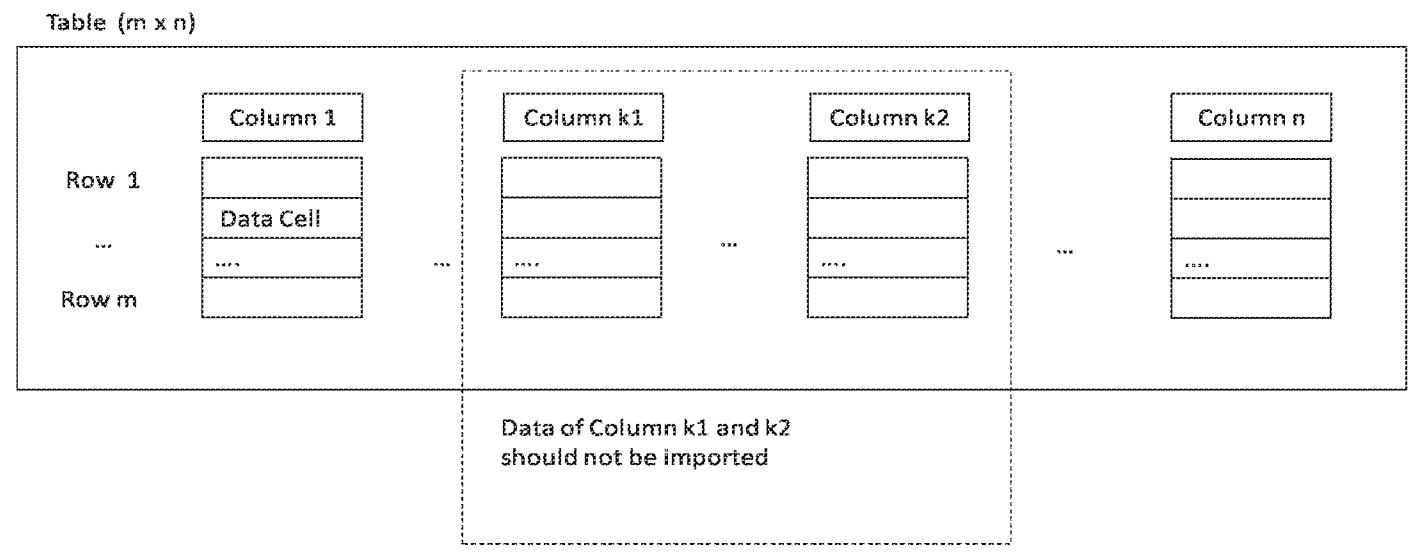
Figure 5:
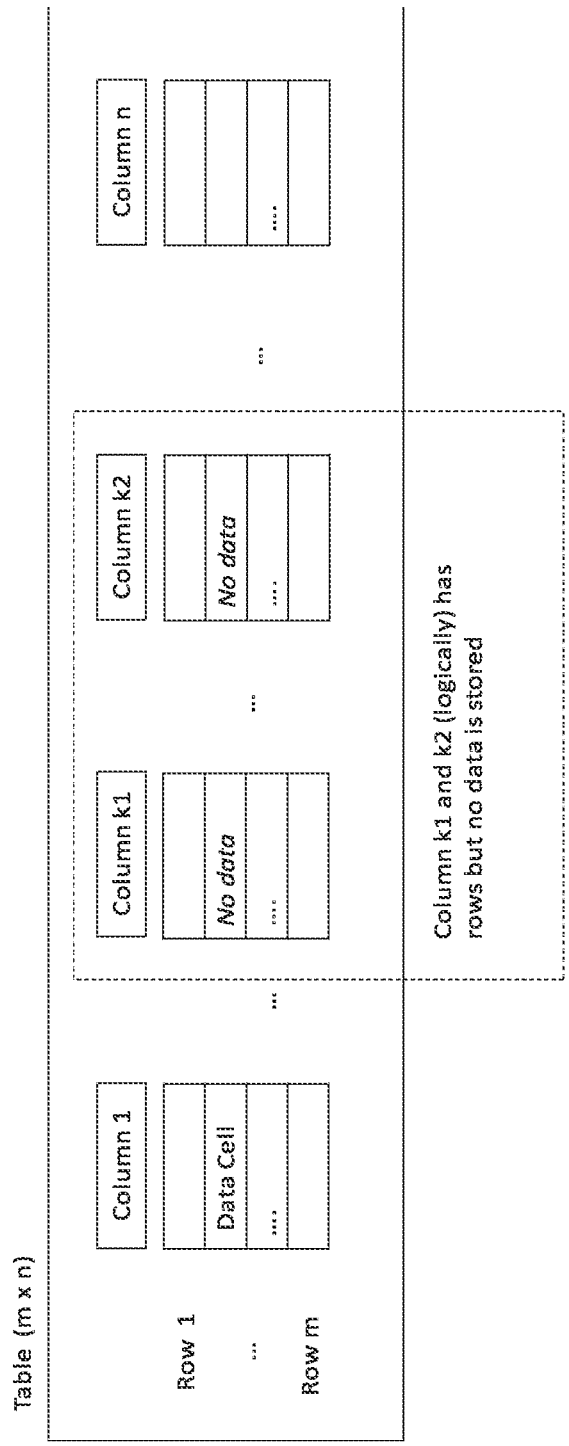

Referring to FIGS. 4 and 5, an import procedure may be initiated by a user by introducing the command IMPORT "SCHEMA2_PATH" k1 k2 FROM 'tmp', for example, with the intention to import all data stored in the data table, with the exception of data stored in columns k1 and k2. As shown in FIG. 5, after the import operation is completed, the structure of data table is maintained (i.e., the data table includes columns 1 through n, rows 1 through m, and the corresponding metadata). However, data stored in the identified columns k1 and k2 is not transferred. In some implementation, rows 1 through m associated with the designated columns may not be maintained in the imported version of the data table. After import, the gaps in data (i.e., data in empty columns) are reconciled. That is, when a gap is encountered during reading from an empty node or record in the data table, no error is generated, because the metadata associated with that record indicates that no data is to be expected at the location of the gap (e.g., columns k1 or k2).

Figure 6:
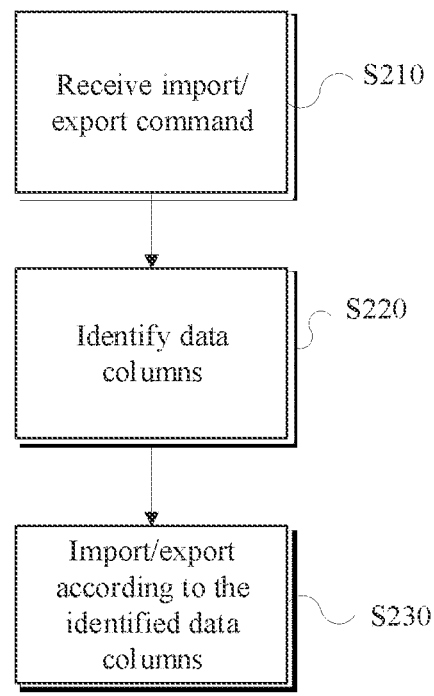
FIG. 6 is a block diagram of example computer-implemented methods for importing or exporting data, in accordance with one or more embodiments.

Referring to FIG. 6, in example implementations, a method for importing or exporting data in accordance with one or more aspects disclose herein may include receiving a command or interaction from a user to import or export a data table stored in storage device 140 (S210). The user command or interaction may identify data columns in the data table (S220). The identification of the columns may be achieved by modifying metadata associated with the selected columns. For example, the metadata may indicate that column k1 should (or should not) be imported or exported. According to such identification, data included in the data table may be either imported or exported based on the user command or interaction (S230).

For example, the metadata may indicate that all data in the data table, except for data in columns k1 and k2, should be imported or exported. In another example, the metadata may indicated that only data in column k1 and k2 should be imported or exported. It is noteworthy that other inclusive or exclusive designations may be also implemented by way of assigning a value (e.g., setting a flag) to metadata associated with a column, wherein the flag or value indicates data or column inclusion, if set to a first value (e.g., 1), or indicates data or column exclusion if set to a second value (e.g., 0). See FIG. 2, for example.

Accordingly, by designating column of data to be excluded during export or import, the binary size of the transferred data for column store tables may be reduced by explicitly omitting parts of the data from being transferred from disk storage on the user's end to the solid state memory on the server and vice versa. Advantageously, such process reduces binary export times and transfer times to remote file or data servers. Same or similarly implemented features may also be used to omit columns with sensitive data, which a user does not want to export to a server for confidentiality reasons, for example.

Furthermore, using the disclosed features for designating columns to be eliminated during import or export, may help reduce the memory requirements by nullifying columns of very large data tables that may then be loaded on server installations with less memory. This may be advantageous because less expensive and more available infrastructure may become available and used. By designating the data as nullified, processing constraint violations that may appear after the import, for example, may be avoided.

As provided earlier, in this disclosure, details and implementations are disclosed, by way of example, as applying to a column-oriented in-memory database. It is noteworthy, however, that such examples should not be construed as limiting the scope of the claimed subject matter to the specific embodiments or details. As such, the inventive concepts provided herein may apply to row-oriented implementations as well either equally or in some variations. For example, a row filter mechanism may be provided, such that in an import or export process or command the rows to be included or excluded may be identified (e.g., the 10 first rows, or rows flagged by a certain value).

Figure 7:
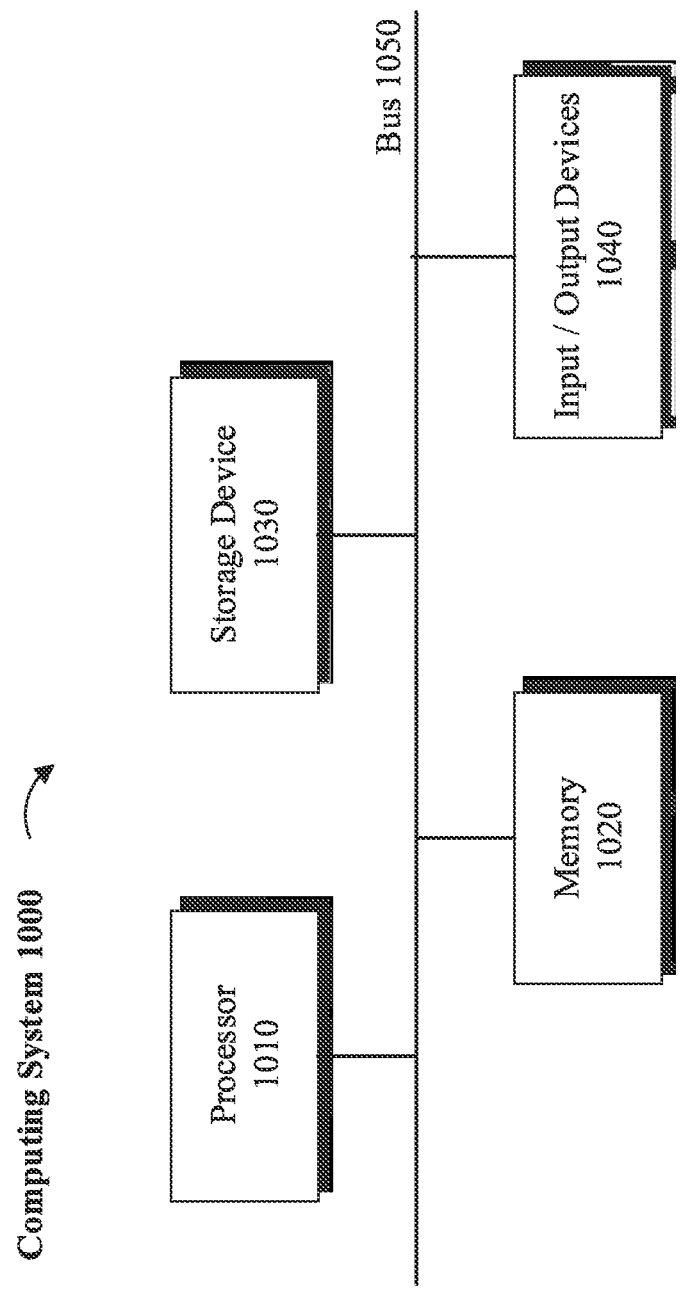
FIG. 7 is a block diagram of an example computing system that may be utilized to perform one or more computing operations or processes as consistent with one or more disclosed features.

Referring to FIG. 7, a block diagram illustrating a computing system 1000 consistent with one or more embodiments is provided. The computing system 1000 may be used to implement or support one or more platforms, infrastructures or computing devices or computing components that may be utilized, in example embodiments, to instantiate, implement, execute or embody the methodologies disclosed herein in a computing environment using, for example, one or more processors or controllers, as provided below.

As shown in FIG. 7, the computing system 1000 can include a processor 1010, a memory 1020, a storage device 1030, and input/output devices 1040. The processor 1010, the memory 1020, the storage device 1030, and the input/output devices 1040 can be interconnected via a system bus 1050. The processor 1010 is capable of processing instructions for execution within the computing system 1000. Such executed instructions can implement one or more components of, for example, a cloud platform. In some implementations of the current subject matter, the processor 1010 can be a single-threaded processor. Alternately, the processor 1010 can be a multi-threaded processor. The processor 1010 is capable of processing instructions stored in the memory 1020 and/or on the storage device 1030 to display graphical information for a user interface provided via the input/output device 1040.

The memory 1020 is a computer readable medium such as volatile or non-volatile that stores information within the computing system 1000. The memory 1020 can store data structures representing configuration object databases, for example. The storage device 1030 is capable of providing persistent storage for the computing system 1000. The storage device 1030 can be a floppy disk device, a hard disk device, an optical disk device, or a tape device, or other suitable persistent storage means. The input/output device 1040 provides input/output operations for the computing system 1000. In some implementations of the current subject matter, the input/output device 1040 includes a keyboard and/or pointing device. In various implementations, the input/output device 1040 includes a display unit for displaying graphical user interfaces.

According to some implementations of the current subject matter, the input/output device 1040 can provide input/output operations for a network device. For example, the input/output device 1040 can include Ethernet ports or other networking ports to communicate with one or more wired and/or wireless networks (e.g., a local area network (LAN), a wide area network (WAN), the Internet).

In some implementations of the current subject matter, the computing system 1000 can be used to execute various interactive computer software applications that can be used for organization, analysis and/or storage of data in various (e.g., tabular) format (e.g., Microsoft Excel®, and/or any other type of software). Alternatively, the computing system 1000 can be used to execute any type of software applications. These applications can be used to perform various functionalities, e.g., planning functionalities (e.g., generating, managing, editing of spreadsheet documents, word processing documents, and/or any other objects, etc.), computing functionalities, communications functionalities, etc. The applications can include various add-in functionalities or can be standalone computing products and/or functionalities. Upon activation within the applications, the functionalities can be used to generate the user interface provided via the input/output device 1040. The user interface can be generated and presented to a user by the computing system 1000 (e.g., on a computer screen monitor, etc.).

One or more aspects or features of the subject matter disclosed or claimed herein may be realized in digital electronic circuitry, integrated circuitry, specially designed application specific integrated circuits (ASICs), field programmable gate arrays (FPGAs) computer hardware, firmware, software, and/or combinations thereof. These various aspects or features may include implementation in one or more computer programs that may be executable and/or interpretable on a programmable system including at least one programmable processor, which may be special or general purpose, coupled to receive data and instructions from, and to transmit data and instructions to, a storage system, at least one input device, and at least one output device. The programmable system or computing system may include clients and servers. A client and server may be remote from each other and may interact through a communication network. The relationship of client and server arises by virtue of computer programs running on the respective computers and having a client-server relationship to each other.

These computer programs, which may also be referred to as programs, software, software applications, applications, components, or code, may include machine instructions for a programmable controller, processor, microprocessor or other computing or computerized architecture, and may be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium may store such machine instructions non-transitorily, such as for example as would a non-transient solid-state memory or a magnetic hard drive or any equivalent storage medium. The machine-readable medium may alternatively or additionally store such machine instructions in a transient manner, such as for example as would a processor cache or other random access memory associated with one or more physical processor cores.

To provide for interaction with a user, one or more aspects or features of the subject matter described herein may be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices may be used to provide for interaction with a user as well. For example, feedback provided to the user may be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive trackpads, voice recognition hardware and software, optical scanners, optical pointers, digital image capture devices and associated interpretation software, and the like.

Terminology

When a feature or element is herein referred to as being "on" another feature or element, it may be directly on the other feature or element or intervening features and/or elements may also be present. In contrast, when a feature or element is referred to as being "directly on" another feature or element, there may be no intervening features or elements present. It will also be understood that, when a feature or element is referred to as being "connected", "attached" or "coupled" to another feature or element, it may be directly connected, attached or coupled to the other feature or element or intervening features or elements may be present. In contrast, when a feature or element is referred to as being "directly connected", "directly attached" or "directly coupled" to another feature or element, there may be no intervening features or elements present.

Although described or shown with respect to one embodiment, the features and elements so described or shown may apply to other embodiments. It will also be appreciated by those of skill in the art that references to a structure or feature that is disposed "adjacent" another feature may have portions that overlap or underlie the adjacent feature.

Terminology used herein is for the purpose of describing particular embodiments and implementations only and is not intended to be limiting. For example, as used herein, the singular forms "a", "an" and "the" may be intended to include the plural forms as well, unless the context clearly indicates otherwise. It will be further understood that the terms "comprises" and/or "comprising," when used in this specification, specify the presence of stated features, steps, operations, processes, functions, elements, and/or components, but do not preclude the presence or addition of one or more other features, steps, operations, processes, functions, elements, components, and/or groups thereof. As used herein, the term "and/or" includes any and all combinations of one or more of the associated listed items and may be abbreviated as "/".

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

Spatially relative terms, such as "forward", "rearward", "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features due to the inverted state. Thus, the term "under" may encompass both an orientation of over and under, depending on the point of reference or orientation. The device may be otherwise oriented (rotated 90 degrees or at other orientations) and the spatially relative descriptors used herein interpreted accordingly. Similarly, the terms "upwardly", "downwardly", "vertical", "horizontal" and the like may be used herein for the purpose of explanation only unless specifically indicated otherwise.

Although the terms "first" and "second" may be used herein to describe various features/elements (including steps or processes), these features/elements should not be limited by these terms as an indication of the order of the features/elements or whether one is primary or more important than the other, unless the context indicates otherwise. These terms may be used to distinguish one feature/element from another feature/element. Thus, a first feature/element discussed could be termed a second feature/element, and similarly, a second feature/element discussed below could be termed a first feature/element without departing from the teachings provided herein.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical values given herein should also be understood to include about or approximately that value, unless the context indicates otherwise.

For example, if the value "10" is disclosed, then "about 10" is also disclosed. Any numerical range recited herein is intended to include all sub-ranges subsumed therein. It is also understood that when a value is disclosed that "less than or equal to" the value, "greater than or equal to the value" and possible ranges between values are also disclosed, as appropriately understood by the skilled artisan. For example, if the value "X" is disclosed the "less than or equal to X" as well as "greater than or equal to X" (e.g., where X is a numerical value) is also disclosed. It is also understood that the throughout the application, data is provided in a number of different formats, and that this data, may represent endpoints or starting points, and ranges for any combination of the data points. For example, if a particular data point "10" and a particular data point "15" may be disclosed, it is understood that greater than, greater than or equal to, less than, less than or equal to, and equal to 10 and 15 may be considered disclosed as well as between 10 and 15. It is also understood that each unit between two particular units may be also disclosed. For example, if 10 and 15 may be disclosed, then 11, 12, 13, and 14 may be also disclosed.

Although various illustrative embodiments have been disclosed, any of a number of changes may be made to various embodiments without departing from the teachings herein. For example, the order in which various described method steps are performed may be changed or reconfigured in different or alternative embodiments, and in other embodiments one or more method steps may be skipped altogether. Optional or desirable features of various device and system embodiments may be included in some embodiments and not in others. Therefore, the foregoing description is provided primarily for the purpose of example and should not be interpreted to limit the scope of the claims and specific embodiments or particular details or features disclosed.

The examples and illustrations included herein show, by way of illustration and not of limitation, specific embodiments in which the disclosed subject matter may be practiced. As mentioned, other embodiments may be utilized and derived therefrom, such that structural and logical substitutions and changes may be made without departing from the scope of this disclosure. Such embodiments of the disclosed subject matter may be referred to herein individually or collectively by the term "invention" merely for convenience and without intending to voluntarily limit the scope of this application to any single invention or inventive concept, if more than one is, in fact, disclosed. Thus, although specific embodiments have been illustrated and described herein, any arrangement calculated to achieve an intended, practical or disclosed purpose, whether explicitly stated or implied, may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The disclosed subject matter has been provided here with reference to one or more features or embodiments. Those skilled in the art will recognize and appreciate that, despite of the detailed nature of the example embodiments provided here, changes and modifications may be applied to said embodiments without limiting or departing from the generally intended scope. These and various other adaptations and combinations of the embodiments provided here are within the scope of the disclosed subject matter as defined by the disclosed elements and features and their full set of equivalents.

A portion of the disclosure of this patent document may contain material, which is subject to copyright protection. The owner has no objection to facsimile reproduction by any one of the patent documents or the patent disclosure, as it appears in the Patent and Trademark Office patent files or records, but reserves all copyrights whatsoever. Certain marks referenced herein may be common law or registered trademarks of the applicant, the assignee or third parties affiliated or unaffiliated with the applicant or the assignee. Use of these marks is for providing an enabling disclosure by way of example and shall not be construed to exclusively limit the scope of the disclosed subject matter to material associated with such marks.

What is claimed is:
1. A computer-implemented method comprising:
    receiving, at a data server associated with a database, a command for a data transfer of a data table that includes a plurality of columns including a first column and a second column, the data transfer between a client machine and the data server over a communications network, wherein metadata associated with the data table designates that first data associated with the first column is not allowed to be transferred in response to the command for the data transfer of the data table and the metadata further designates that second data asso- ciated with the second column is allowed to be transferred in response to the command for the data transfer of the data table;

in response to receiving the command for the data transfer of the data table, determining, based on the metadata, whether the plurality of columns including the first column and the second column of the data table have been designated to allow or not allow the data transfer; and in response to the determining, executing the command for the data transfer of the data table according to the columns designated to allow the data transfer, such that at least the second data associated with the second column is transferred in response to the command.

2. The computer-implemented method of claim 1, wherein the data transfer of the second data associated with the second column is transferred by copying to a destination storage device.

3. The computer-implemented method of claim 2, wherein the data transfer of the second data includes a data structure of the plurality of columns including the first column and the second column, wherein the data structure is maintained as part of the data transfer without providing the first data.

4. The computer-implemented method of claim 1, wherein the client machine comprises a computing system used by a user issuing the command for the data transfer.

5. The computer-implemented method of claim 1, wherein the command is an import command that further includes an indication providing the metadata that designates that the first data of the first column is not allowed to be imported in response to the command.

6. The computer-implemented method of claim 1, wherein the command is an export command that further includes an indication providing the metadata that designates that the first data of the first column is not allowed to be exported in response to the command.

7. A system comprising:

at least one programmable processor; and a non-transitory machine-readable medium storing instructions that, when executed by the at least one programmable processor, cause the at least one programmable processor to perform operations comprising:

receiving, at a data server associated with a database, a command for a data transfer of a data table that includes a plurality of columns including a first column and a second column, the data transfer between a client machine and the data server over a communications network, wherein metadata associated with the data table designates that first data associated with the first column is not allowed to be transferred in response to the command for the data transfer of the data table and the metadata further designates that second data associated with the second column is allowed to be transferred in response to the command for the data transfer of the data table;

in response to receiving the command for the data transfer of the data table, determining, based on the metadata, whether the plurality of columns including the first column and the second column of the data table have been designated to allow or not allow the data transfer; and in response to the determining, executing the command for the data transfer of the data table according to the columns designated to allow the data transfer, such that at least the second data associated with the second column is transferred in response to the command.

8. The system of claim 7, wherein the data transfer of the second data associated with the second column is transferred by copying to a destination storage device.

9. The system of claim 8, wherein the data transfer of the second data includes a data structure of the plurality of columns including the first column and the second column, wherein the data structure is maintained as part of the data transfer without providing the first data.

10. The system of claim 7, wherein the client machine comprises a computing system used by a user issuing the command for the data transfer.

11. The system of claim 7, wherein the command is an import command that further includes an indication providing the metadata that designates that the first data of the first column is not allowed to be imported in response to the command.

12. The system of claim 7, wherein the command is an export command that further includes an indication providing the metadata that designates that the first data of the first column is not allowed to be exported in response to the command.

13. A non-transitory machine-readable medium storing instructions that, when executed by at least one programmable processor, cause the at least one programmable processor to perform operations comprising:

receiving, at a data server associated with a database, a command for a data transfer of a data table that includes a plurality of columns including a first column and a second column, the data transfer between a client machine and the data server over a communications network, wherein metadata associated with the data table designates that first data associated with the first column is not allowed to be transferred in response to the command for the data transfer of the data table and the metadata further designates that second data associated with the second column is allowed to be transferred in response to the command for the data transfer of the data table;

in response to receiving the command for the data transfer of the data table, determining, based on the metadata, whether the plurality of columns including the first column and the second column of the data table have been designated to allow or not allow the data transfer; and in response to the determining, executing the command for the data transfer of the data table according to the columns designated to allow the data transfer, such that at least the second data associated with the second column is transferred in response to the command.

* * * * *